(12) United States Patent
Zhang et al.

(10) Patent No.: US 11,478,103 B2
(45) Date of Patent: Oct. 25, 2022

(54) WIRELESS POWER SUPPLY SYSTEM FOR COOKING APPLIANCE AND COOKING APPLIANCE

(71) Applicant: FOSHAN SHUNDE MIDEA ELECTRICAL HEATING APPLIANCES MANUFACTURING CO., LTD., Foshan (CN)

(72) Inventors: Fan Zhang, Foshan (CN); Yunfeng Wang, Foshan (CN); Deyong Jiang, Foshan (CN); Jun Lei, Foshan (CN); Wenhua Liu, Foshan (CN); Shufeng Huang, Foshan (CN); Lutian Zeng, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 398 days.

(21) Appl. No.: 16/630,699

(22) PCT Filed: Dec. 11, 2017

(86) PCT No.: PCT/CN2017/115480
§ 371 (c)(1),
(2) Date: Jan. 13, 2020

(87) PCT Pub. No.: WO2019/037334
PCT Pub. Date: Feb. 28, 2019

(65) Prior Publication Data
US 2021/0085119 A1    Mar. 25, 2021

(30) Foreign Application Priority Data

Aug. 25, 2017  (CN) .......................... 201710739808.5
Aug. 25, 2017  (CN) .......................... 201721072978.4
Sep. 15, 2017  (CN) .......................... 201710834242.4

(51) Int. Cl.
*A47J 27/086*    (2006.01)
*H02J 50/80*    (2016.01)
(Continued)

(52) U.S. Cl.
CPC .......... *A47J 27/086* (2013.01); *A47J 27/004* (2013.01); *A47J 27/0802* (2013.01);
(Continued)

(58) Field of Classification Search
CPC .... A47J 27/086; A47J 27/004; A47J 27/0802; H02J 7/00032; H02J 7/04; H02J 7/345;
(Continued)

(56) References Cited

U.S. PATENT DOCUMENTS

2013/0147279 A1    6/2013  Muratov
2020/0244108 A1*   7/2020  Kim .................... H02J 50/80

FOREIGN PATENT DOCUMENTS

CN         2870670 Y     2/2007
CN       201612491 U    10/2010
(Continued)

OTHER PUBLICATIONS

World Intellectual Property Organization (WIPO) Written Opinion for PCT/CN2017/115480 with translation dated May 30, 2018 7 Pages.
(Continued)

*Primary Examiner* — Paul Dinh
(74) *Attorney, Agent, or Firm* — Anova Law Group, PLLC

(57) ABSTRACT

A wireless power supply system for a cooking appliance includes a power transmission device and a power reception device. The power transmission device includes a transmission coil and a coil driving circuit coupled to the transmis- (Continued)

sion coil and configured to drive the transmission coil to generate an alternating electromagnetic field and vary a resonance voltage of the transmission coil. The power reception device includes a reception coil matching the transmission coil and configured to sense the alternating electromagnetic field to generate a varying induction voltage signal that varies according to the varying resonance voltage and a communication and demodulation circuit configured to demodulate the varying induction voltage signal to output demodulated data.

15 Claims, 4 Drawing Sheets

(51) Int. Cl.
  *H02J 50/12*  (2016.01)
  *H02J 7/00*  (2006.01)
  *A47J 27/00*  (2006.01)
  *A47J 27/08*  (2006.01)
  *H02J 7/04*  (2006.01)
  *H02J 7/34*  (2006.01)
  *H05B 1/02*  (2006.01)

(52) U.S. Cl.
  CPC ............ *H02J 7/00032* (2020.01); *H02J 7/04* (2013.01); *H02J 7/345* (2013.01); *H02J 50/12* (2016.02); *H02J 50/80* (2016.02); *H05B 1/0261* (2013.01); *H02J 2207/20* (2020.01); *H02J 2207/50* (2020.01)

(58) Field of Classification Search
  CPC ........ H02J 50/12; H02J 50/80; H02J 2207/20; H02J 2207/50; H02J 7/34; H05B 1/0261; H05B 6/1236

USPC .......................................... 320/108; 219/488
  See application file for complete search history.

(56) References Cited

FOREIGN PATENT DOCUMENTS

| | | |
|---|---|---|
| CN | 202069424 U | 12/2011 |
| CN | 102342178 A | 2/2012 |
| CN | 202981538 U | 6/2013 |
| CN | 104367170 A | 2/2015 |
| CN | 104882971 A | 9/2015 |
| CN | 106602744 A | 4/2017 |
| CN | 206062877 U | 4/2017 |
| CN | 206197741 U | 5/2017 |
| JP | 0465092 A | 3/1992 |
| WO | 2019037334 A1 | 2/2019 |

OTHER PUBLICATIONS

The State Intellectual Property Office of PRC (SIPO) The First Office Action For CN Application No. 201710739808.5 dated Aug. 19, 2019 18 Pages (Translation Included ).
The State Intellectual Property Office of PRC (SIPO) The First Office Action For CN Application No. 201710739808.5 dated Mar. 2, 2020 18 Pages (Translation Included ).
The State Intellectual Property Office of PRC (SIPO) The First Office Action For CN Application No. 201710834242.4 dated Mar. 4, 2020 15 Pages (Translation Included ).
Canadian Intellectual Property Office The Office Action For CA Application No. 3066024 dated Feb. 11, 2021 5 Pages.
World Intellectual Property Organization (WIPO) International Search Report for PCT/CN2017/115480 dated May 30, 2018 6 Pages.

\* cited by examiner

WIRELESS POWER SUPPLY SYSTEM FOR COOKING APPLIANCE AND COOKING APPLIANCE

CROSS-REFERENCE TO RELATED APPLICATIONS

This application is a National Stage Entry under 35 U.S.C. § 371 of International Application No. PCT/CN2017/115480, filed Dec. 11, 2017, which claims priority to Chinese Application Nos. 201710739808.5 and 201721072978.4, both filed Aug. 25, 2017, and to Chinese Application No. 201710834242.4, filed Sep. 15, 2019, the entire contents of all of which are incorporated herein by reference.

TECHNICAL FIELD

The present disclosure relates to the technical field of household appliances, in particular to a wireless power supply system for a cooking appliance and the cooking appliance.

BACKGROUND

At present, in a wireless power supply system applied to a cooking appliance, wireless communication is generally one-way communication, and the one-way communication is a transmission of relevant data from a power-reception end to a power-transmission end. Thus, information interaction between the reception end and the transmission end cannot be realized, and intelligent development of the cooking appliance is not facilitated.

In addition, the power control of the wireless power supply system is generally that after the reception device is powered by wireless power, the main control chip of the reception device transmits the output power data of the reception device to the transmission device, and the control chip of the transmission device receives the output power data and adjusts the transmission power of the transmission device according to requirements. However, in this power control mode, a wire coil is required for a carrier wave, and the data transmission speed is slow. Usually, the reception device can feed back the output power to the transmission device once every more than 30 ms, resulting in a slow power regulation of the transmission device. If the load of the reception device suddenly increases, the stabilized supply voltage supplied to the main control chip may be lowered, the power down condition of the main control chip of the reception device occurs, causing that the power regulation cannot be normally carried out and the normal operation of the wireless power supply system is influenced.

SUMMARY

The present disclosure is directed to solve at least one of the technical problems in the related art to some extent. To this end, it is a first object of the present disclosure to provide a wireless power supply system for a cooking appliance, which can realize wireless communication between a power-transmission end and a power-reception end on the cooking appliance, so that the reception end of the cooking appliance can control the cooking appliance according to data transmitted from the transmission end, thereby further improving the intelligence of the cooking appliance.

It is a second object of the present disclosure to provide a cooking appliance.

To achieve the above objects, an embodiment of a first aspect of the present disclosure provides a wireless power supply system for a cooking appliance, and the wireless power supply system includes a reception device including a reception coil, a voltage processing circuit connected with the reception coil, a first control chip and a first communication and demodulation circuit; a transmission device including a transmission coil matched with the reception coil, a coil driving circuit and a second control chip; where the second control chip controls the coil driving circuit to drive the transmission coil to generate an alternating electromagnetic field, the reception coil generates an induction voltage signal according to the alternating electromagnetic field, and the voltage processing circuit processes the induction voltage signal to output a stabilized power supply so as to supply power to the first control chip and the first communication and demodulation circuit; and the second control chip further controls the coil driving circuit to vary a resonance voltage of the transmission coil and the induction voltage signal generated by the reception coil is varied, and the first communication and demodulation circuit demodulates the varying induction voltage signal to output demodulated data to the first control chip so as to realize wireless communication between the first control chip and the second control chip.

According to the wireless power supply system for the cooking appliance, the second control chip controls the coil driving circuit to drive the transmission coil to generate an alternating electromagnetic field, the reception coil generates an induction voltage signal according to the alternating electromagnetic field, and the voltage processing circuit processes the induction voltage signal to output a stabilized power supply so as to supply power to the first control chip and the first communication and demodulation circuit; and the second control chip further controls the coil driving circuit to vary a resonance voltage of the transmission coil and the induction voltage signal generated by the reception coil is varied, and the first communication and demodulation circuit demodulates the varying induction voltage signal to output demodulated data to the first control chip so as to realize wireless communication between the first control chip and the second control chip. Therefore, the present disclosure can realize the wireless communication between the power-transmission end and the power-reception end on the cooking appliance, so that the power-reception end of the cooking appliance can control the cooking appliance according to the data sent by the power-transmission end, thereby further improving the intelligence of the cooking appliance.

In addition, the wireless power supply system for the cooking appliance according to the present disclosure can also have the following additional technical features.

In an embodiment of the present disclosure, the stabilized power supply further supplies power to a load provided in a pot cover of the cooking appliance.

In an embodiment of the present disclosure, the coil driving circuit includes a driving unit connected with the second control chip, and a bridge circuit connected with the driving unit, where the second control chip adjusts an output power of the bridge circuit by adjusting a duty ratio or a frequency of a control signal output to the driving unit so as to vary the resonance voltage of the transmission coil.

In an embodiment of the present disclosure, the bridge circuit is a half-bridge circuit including: a first switch transistor, where a control terminal of the first switch transistor is connected with a first driving output terminal of the driving unit, and a first terminal of the first switch transistor is connected with a preset power supply; and a second switch transistor, where a control terminal of the second switch transistor is connected with a second driving output terminal of the driving unit, a first terminal of the second switch transistor is connected with a second terminal of the first switch transistor and is provided with a first node, and a second terminal of the second switch transistor is grounded; and the first node is connected with one end of the transmission coil via a first capacitor, and the other end of the transmission coil is grounded.

In an embodiment of the present disclosure, the voltage processing circuit includes a rectifier bridge and a voltage stabilizing unit, where a first input terminal of the rectifier bridge is connected with one end of the reception coil via a second capacitor, a second input terminal of the rectifier bridge is connected with the other end of the reception coil; and a positive output terminal of the rectifier bridge is connected with the voltage stabilizing unit, and the voltage stabilizing unit outputs the stabilized voltage supply to the first control chip.

In an embodiment of the present disclosure, an input terminal of the first communication and demodulation circuit is connected with the other end of the reception coil, an output terminal of the first communication and demodulation circuit is connected with the first control chip, and a power supply terminal of the first communication and demodulation circuit is connected with an output terminal of the voltage stabilizing unit.

In an embodiment of the present disclosure, the transmission coil and the reception coil are equivalent in size and provided coaxially.

In an embodiment of the present disclosure, a distance between the transmission coil and the reception coil is in a range of 0 to 50 cm.

According to an embodiment of the present disclosure, the reception device further includes an energy storage circuit and a power feedback circuit, the voltage processing circuit is connected with the energy storage circuit, the energy storage circuit is connected with the power feedback circuit, the power feedback circuit is connected with the reception coil via the first communication and demodulation circuit, and the power feedback circuit is configured to detect an output power of the reception device; and the transmission device further includes a second communication and demodulation circuit, the second control chip is connected with the second communication and demodulation circuit, and the second communication and demodulation circuit is connected with the transmission coil; where the stabilized power supply is further configured to charge the energy storage circuit; when the load suddenly increases to cause the stabilized power supply to power down, the energy storage circuit supplies power to the power feedback circuit; the first communication and demodulation circuit modulates the output power to supply a power modulation signal to the reception coil; the second communication and demodulation circuit receives the power modulation signal from the transmission coil, and demodulates the power modulation signal to send the output power to the second control chip; and the second control chip adjusts the transmission power of the transmission device according to the output power so as to enable the transmission power to be matched with the output power.

According to an embodiment of the present disclosure, the energy storage circuit includes an energy storage capacitor or an energy storage battery.

According to an embodiment of the present disclosure, when the energy storage circuit includes the energy storage capacitor, the capacity of the energy storage capacitor is determined according to the power consumption of the power feedback circuit.

According to an embodiment of the present disclosure, a diode is further connected between the voltage stabilizing unit in the voltage processing circuit and the energy storage circuit, an anode of the diode is connected with an output terminal of the voltage stabilizing unit, and a cathode of the diode is connected with the energy storage circuit.

According to an embodiment of the present disclosure, the cooking appliance includes a pot cover and a pot body, where the reception device is provided at the pot cover, and the transmission device is provided at the pot body.

To achieve the above objects, an embodiment of a second aspect of the present disclosure provides a cooking appliance including the wireless power supply system for the cooking appliance according to the embodiment of the first aspect of the present disclosure.

According to the cooking appliance provided by the embodiment of the present disclosure, the wireless communication between the power-transmission end and the power-reception end can be realized by the above-mentioned wireless power supply system for the cooking appliance, so that the power-reception end can control the cooking appliance according to the data sent by the power-transmission end, and the intelligence is further improved.

According to an embodiment of the present disclosure, the cooking appliance is any one of an electric pressure cooker and an electric rice cooker.

Advantages of additional aspects of the present disclosure will be set forth in part in the description which follows and, in part, will be obvious from the description, or may be learned by practice of the present disclosure.

DETAILED DESCRIPTION

Figures 1, 2:
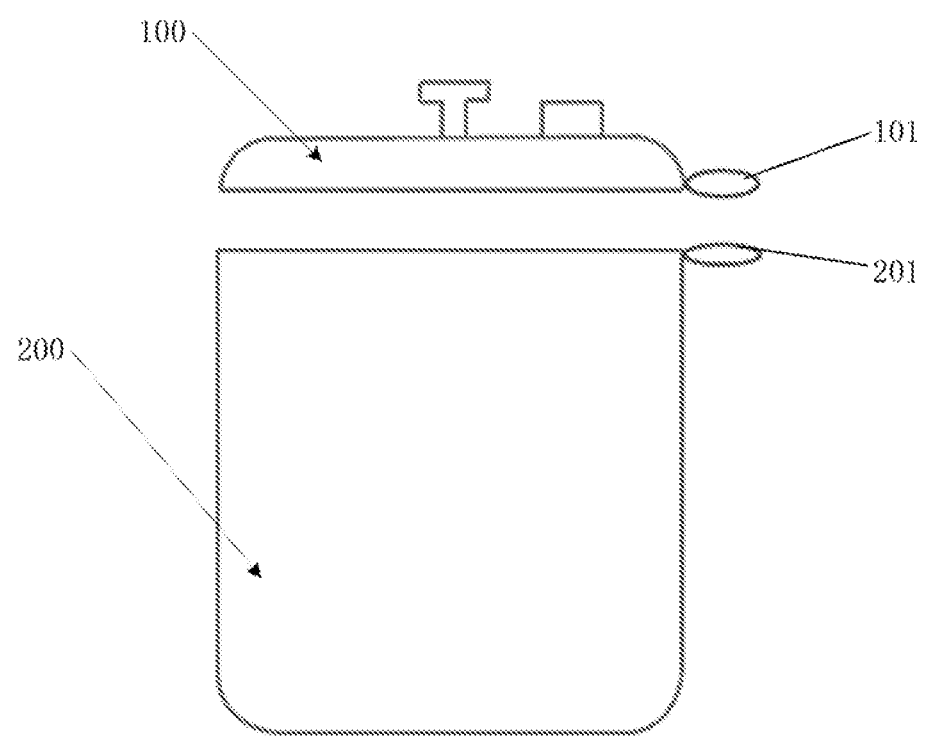
FIG. 1 is a block diagram of a wireless power supply system for a cooking appliance according to an embodiment of the present disclosure.
FIG. 2 is a schematic diagram showing positions of a transmission coil and a reception coil according to an embodiment of the present disclosure.

Reference will now be made in detail to the embodiments of the present disclosure, examples of which are illustrated in the accompanying drawings, where like or similar reference numerals refer to the same or similar elements or elements having the same or similar function throughout. The embodiments described below by reference to the drawings are exemplary and are intended to be illustrative of the present disclosure and are not to be construed as limiting the present disclosure.

A wireless power supply system for a cooking appliance and a cooking appliance having the same according to an embodiment of the present disclosure will be described below with reference to the accompanying drawings.

FIG. 1 is a block diagram of a wireless power supply system for a cooking appliance according to an embodiment of the present disclosure. In an embodiment of the present disclosure, the cooking appliance may include a pot cover and a pot body, and the cooking pot may be an electric pressure cooker or an electric rice cooker or the like.

As shown in FIG. 1, a wireless power supply system for a cooking appliance includes a reception device 10 and a transmission device 20. The reception device 10 may be provided at a pot cover, and includes a reception coil 101, a voltage processing circuit 102 connected with the reception coil 101, a first control chip 103, and a first communication and demodulation circuit 104. The transmission device 20 may be provided at a pot body, and includes a transmission coil 201 matched with the reception coil 101, a coil driving circuit 202, and a second control chip 203.

The second control chip 203 controls the coil driving circuit 202 to drive the transmission coil 101 to generate an alternating electromagnetic field, the reception coil 101 generates an induction voltage signal according to the alternating electromagnetic field, and the voltage processing circuit 102 processes the induction voltage signal to output a stabilized power supply so as to supply power to the first control chip 103 and the first communication and demodulation circuit 104. In addition, the second control chip 203 further controls the coil driving circuit 202 to vary a resonance voltage of the transmission coil 201 and the induction voltage signal generated by the reception coil 101 is varied, and the first communication and demodulation circuit 104 demodulates the varying induction voltage signal to output demodulated data to the first control chip 103 so as to realize wireless communication between the first control chip 103 and the second control chip 203.

In the embodiment of the present disclosure, the transmission coil 201 and the reception coil 101 are equivalent in size and provided coaxially so that the reception coil 101 can well receive the alternating electromagnetic field generated by the transmission coil 201. The distance between the transmission coil 201 and the reception coil 101 may be in a range of 0 to 20 cm, and the frequency of the alternating electromagnetic field may be in a range of 80 KHz to 300 KHz.

It should be noted that when the sizes of the transmission coil 201 and the reception coil 101 are substantially the same as well as the numbers of windings of the coils, the transmission coil 201 and the reception coil 101 are equivalent in size. The size may include a diameter size, a coil thickness size and a shape size, etc. of the transmission coil 201 and the reception coil 101.

Specifically, in an embodiment of the present disclosure, mechanical positioning can be used to ensure that the reception coil 101 on the pot cover 100 and the transmission coil 201 on the pot body 200 are coaxial when the user closes the pot cover 100, as shown in FIG. 2.

After the user powers on the pot body 200 of the cooking appliance, the second control chip 203 controls the coil driving circuit 202 to start working; and after the coil driving circuit 202 starts working, the transmission coil 201 provided at the pot body 200 is driven to generate an alternating electromagnetic field. When the reception coil 101 provided at the pot cover 100 induces the alternating electromagnetic field, an induction voltage signal is generated according to the alternating electromagnetic field, and then the voltage processing circuit 102 in the pot cover 100 processes, such as rectifies or stabilizes, the induction voltage signal to output a stabilized power supply so as to supply power to the first control chip 103 and the first communication and demodulation circuit 104. In addition, after the user powers on the pot body 200 of the cooking appliance, the second control chip 203 controls the coil driving circuit 202 to start working, resonance is generated on the transmission coil 201, and the second control chip 203 can change the induction voltage signal generated by the reception coil 101 by adjusting the magnitude of the resonance voltage of the transmission coil. The first communication and demodulation circuit 104 demodulates the varying induction voltage signal, outputs corresponding demodulated data to the first control chip 103, and the first control chip 103 can control the cooking appliance correspondingly according to the demodulated data. Therefore, the wireless power supply system can realize the wireless communication between the power-transmission end and the power-reception end on the cooking appliance, so that the power-reception end of the cooking appliance can control the cooking appliance according to the data sent by the power-transmission end, thereby further improving the intelligence of the cooking appliance.

According to an embodiment of the present disclosure, the stabilized power supply also supplies power to a load provided in the pot cover 100, as shown in FIG. 1.

Specifically, the load may include a pressure detection sensor, a temperature detection sensor, a humidity detection sensor, a display, etc. After the user powers on the pot body 200 of the cooking appliance, the stabilized power supply output by the voltage processing circuit 102 in the pot cover 100 supplies power to loads such as a pressure detection sensor, a temperature detection sensor, a humidity detection sensor, a display, and a signal processing module disposed in the pot cover 100 in addition to the first control chip 103 and the first communication and demodulation circuit 104. The load provided in the pot cover 100 starts to work after being powered on. For example, the temperature detection sensor starts to detect the temperature value in the cooking pot in real time, and transmits the detected temperature value to the display in the pot cover 100 to be displayed via the display, so that the user can know the temperature information of the current cooking pot in real time.

Figure 3:
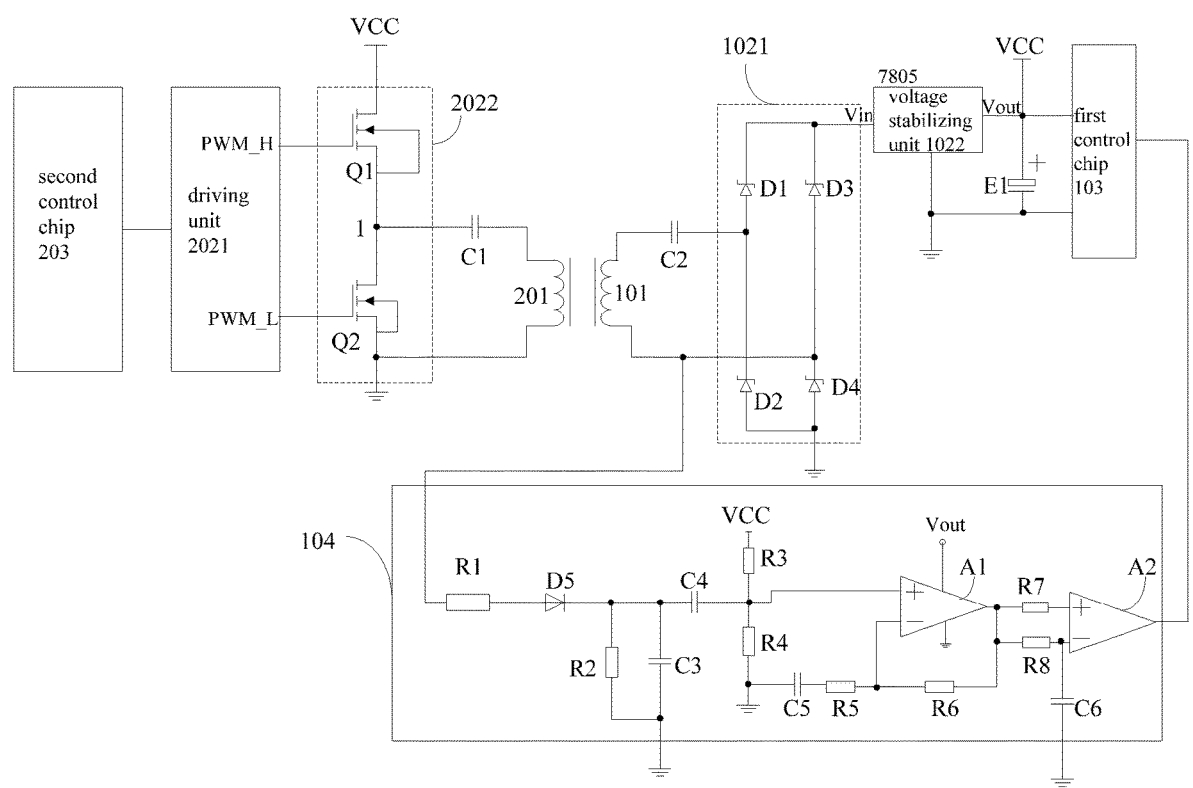
FIG. 3 is a circuit topology diagram of a wireless power supply system for a cooking appliance according to an embodiment of the present disclosure.

Further, according to an embodiment of the present disclosure, the coil driving circuit 202 includes a driving unit 2021 connected with the second control chip 203, and a bridge circuit 2022 connected with the driving unit 2021, where the second control chip 203 adjusts an output power of the bridge circuit 2022 by adjusting a duty ratio or a frequency of a control signal output to the driving unit 2021 so as to vary the resonance voltage of the transmission coil 201, as shown in FIG. 3.

Further, as shown in FIG. 3, the bridge circuit 2022 may be a half-bridge circuit, which may include a first switch transistor Q1 and a second switch transistor Q2. The control terminal of the first switch transistor Q1 is connected with a first driving output terminal PWM_H of the driving unit 2021, and the first terminal of the first switch transistor Q1 is connected with a preset power supply VCC. A control terminal of the second switch transistor Q2 is connected with the second driving output terminal PWM_L of the driving unit 2021, a first terminal of the second switch transistor Q2 is connected with a second terminal of the first switch transistor Q1 and is provided with a first node 1, and a second terminal of the second switch transistor Q2 is grounded; and the first node 1 is connected with one end of the transmission coil 201 via a first capacitor C1, and the other end of the transmission coil 201 is grounded.

Figure 4:
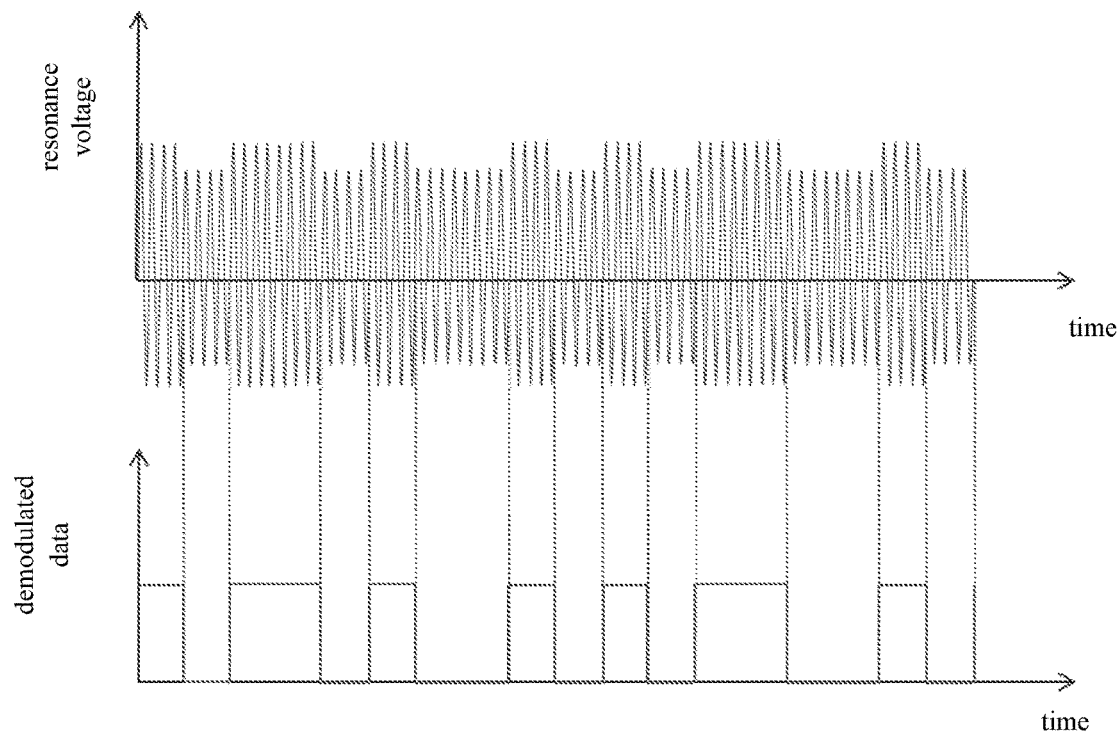
FIG. 4 is a waveform diagram of a second control chip in communication with a first control chip according to an embodiment of the present disclosure.

Specifically, as shown in FIG. 3, the driving unit 2021 may be a PWM (Pulse Width Modulation) driving circuit, and the control signal may be a PWM signal. The first switch transistor Q1 and the second switch transistor Q2 may be N-channel enhancement type MOSFETs (Metal-Oxide-Semiconductor Field-Effect Transistors). After the pot body 200 of the cooking appliance is powered on, the transmission coil 201 performs LC resonance; and according to the working principle of the half-bridge circuit, the output power of the bridge circuit 2022 can be adjusted when the second control chip 203 adjusts the duty ratio or frequency of the PWM signal output to the driving unit 2021. As shown in FIG. 4, a change in the output power of the bridge circuit 2022 causes a change in the amplitude of the resonance voltage on the transmission coil 201, thereby causing a change in the induction voltage signal generated by the reception coil 101, and the first communication and demodulation circuit 104 demodulates the varying induction voltage signal to output demodulated data to the first control chip 103 so as to realize wireless communication between the first control chip 103 and the second control chip 203.

Specifically, as shown in FIG. 3, the first communication and demodulation circuit 104 may be composed of first to eighth resistors R1-R8, third to seventh capacitors C3-C6, a diode D5, a first amplifier A1, and a second amplifier A2, which are connected specifically as shown in FIG. 3 and will not be described in detail herein. As shown in FIG. 4, when the amplitude of the resonance voltage on the transmission coil 201 varies, the induction voltage signal on the reception coil 101 also varies; and the first communication and demodulation circuit 104 demodulates the induction voltage signal and outputs a corresponding demodulated signal (demodulated data) to the first control chip 103, thereby realizing wireless communication between the first control chip 103 and the second control chip 203.

According to an embodiment of the present disclosure, as shown in FIG. 3, the voltage processing circuit 102 may include a rectifier bridge 1021 and a voltage stabilizing unit 1022. A first input terminal of the rectifier bridge 1021 is connected with one end of the reception coil 101 via a second capacitor C2, a second input terminal of the rectifier bridge 1021 is connected with the other end of the reception coil 101; and a positive output terminal of the rectifier bridge 1021 is connected with the voltage stabilizing unit 1022, and the voltage stabilizing unit 1022 outputs a stabilized voltage supply to the first control chip 103.

Specifically, as shown in FIG. 3, the rectifier bridge 1021 may include first to fourth voltage-regulator diodes D1-D4 connected specifically shown in FIG. 3 and will not be described in detail herein. The voltage stabilizing unit 1022 may include a 7805 three-terminal integrated voltage stabilizer, an input terminal Vin of the voltage stabilizing unit 1022 is connected with a positive output terminal of the rectifier bridge 1021, and an output terminal Vout of the voltage stabilizing unit 1022 is connected with one end of the electrolytic capacitor E1; E1 may reduce low-frequency interference, and the voltage stabilizing unit 1022 may output stable direct current (stabilized voltage supply) to loads in the first control chip 103 and the pot cover 100 so as to supply power to the first control chip 103 and the loads.

In an embodiment of the present disclosure, as shown in FIG. 3, an input terminal of a first communication and demodulation circuit 104 is connected with the other end of the reception coil 101, an output terminal of the first communication and demodulation circuit 104 is connected with a first control chip 103, a power supply terminal of the first communication and demodulation circuit 104 is connected with an output terminal Vout of a voltage stabilizing unit 1022, and the voltage stabilizing unit 1022 provides a stabilized power supply to the first communication and demodulation circuit 104.

In summary, according to the wireless power supply system for the cooking appliance, the second control chip controls the coil driving circuit to drive the transmission coil to generate an alternating electromagnetic field, the reception coil generates an induction voltage signal according to the alternating electromagnetic field, and the voltage processing circuit processes the induction voltage signal to output a stabilized power supply so as to supply power to the first control chip and the first communication and demodulation circuit; and the second control chip further controls the coil driving circuit to vary a resonance voltage of the transmission coil and the induction voltage signal generated by the reception coil is varied, and the first communication and demodulation circuit demodulates the varying induction voltage signal to output demodulated data to the first control chip so as to realize wireless communication between the first control chip and the second control chip. Therefore, the present disclosure can realize the wireless communication between the power-transmission end and the power-reception end on the cooking appliance, so that the power-reception end of the cooking appliance can control the cooking appliance according to the data sent by the power-transmission end, thereby further improving the intelligence of the cooking appliance.

In addition, the embodiment of the present disclosure also provides a cooking appliance including the wireless power supply system for the cooking appliance according to any embodiment of the present disclosure.

In an embodiment of the present disclosure, the cooking appliance may be one of an electric pressure cooker and an electric rice cooker.

According to the cooking appliance provided by the embodiment of the present disclosure, the wireless communication between the power-transmission end and the power-reception end can be realized by the above-mentioned wireless power supply system for the cooking appliance, so that the power-reception end can control the cooking appliance according to the data sent by the power-transmission end, and the intelligence is further improved.

Figure 5:
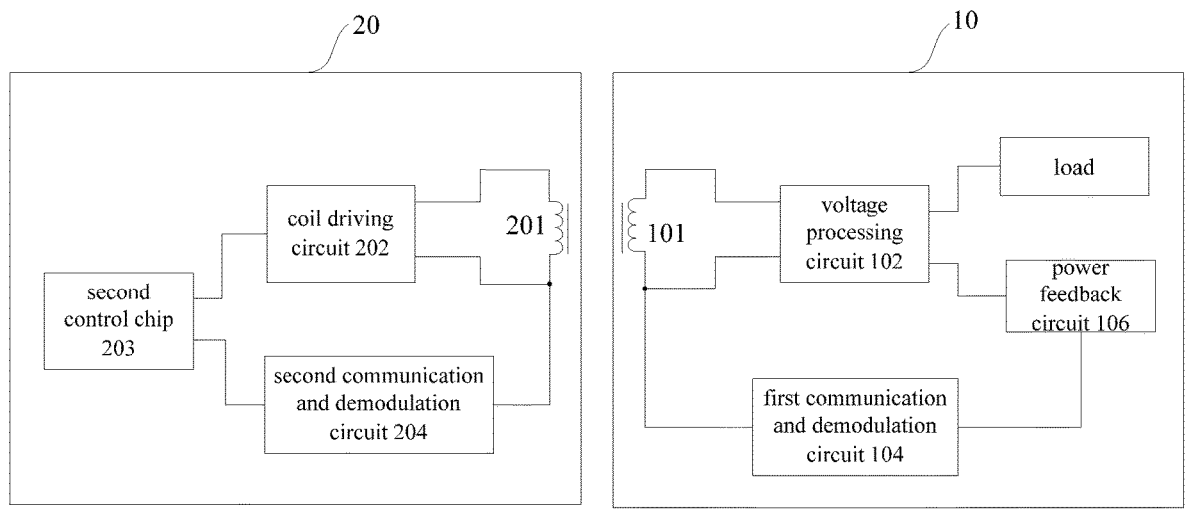
FIG. 5 is a block diagram of a wireless power supply system for a cooking appliance in the related art.

In addition, the related art proposes a wireless power supply system, as shown in FIG. 5, including a reception device 10 and a transmission device 20; where the reception device 10 may include a reception coil 101, a voltage processing circuit 102, a power feedback circuit 106, and a first communication and demodulation circuit 104; and the transmission device 20 may include a transmission coil 201, a coil driving circuit 202, a second control chip 203, and a second communication and demodulation circuit 204, which are connected specifically as shown in FIG. 5 and will not be described in detail herein.

The transmission coil 201 is a power transmission coil, the reception coil 101 is a power reception coil, and the two coils are placed adjacent to each other; and after a user powers on the cooking appliance, the second control chip 203 controls the coil driving circuit 202 to start working, and drives the transmission coil 201 to generate an alternating electromagnetic field. When the reception coil 101 induces the alternating electromagnetic field, an induction voltage signal is generated according to the alternating electromagnetic field, and then the induction voltage signal is processed by the voltage processing circuit 102 to output a stabilized power supply for supplying power to the load and power feedback circuit 106. After the power feedback circuit 106 is powered on, the power feedback circuit 106 detects the output power of the reception device 10, the first communication and demodulation circuit 104 modulates the output power to generate a power modulation signal, the power modulation signal is loaded onto the reception coil 101, mutual inductance is generated on the transmission coil 201, and the second communication and demodulation circuit 204 demodulates the power modulation signal; and the second control chip 203 can obtain the output power of the reception device 10 according to the demodulated power modulation signal and adjust the transmission power of the transmission device 20 according to the output power, so that the transmission power is matched with the output power.

However, the transmission coil 201 and the reception coil 101 transmit both of power and signals, and modulation and demodulation for the power signals requires at least about 30 ms, so that the output power of the reception device 10 has a long feedback time. If the load of the reception device 10 suddenly increases, and the suddenly increased load power is much greater than the transmission power of the transmission device 20, it is highly likely that the stabilized power supply is directly lowered to zero, thus causing the power feedback circuit 106 to be powered off, so that the power signal cannot be transmitted normally, the transmission device 20 cannot receive the power data, and the power adjustment cannot be completed normally, thereby affecting the normal operation of the whole wireless power supply system.

Figure 6:
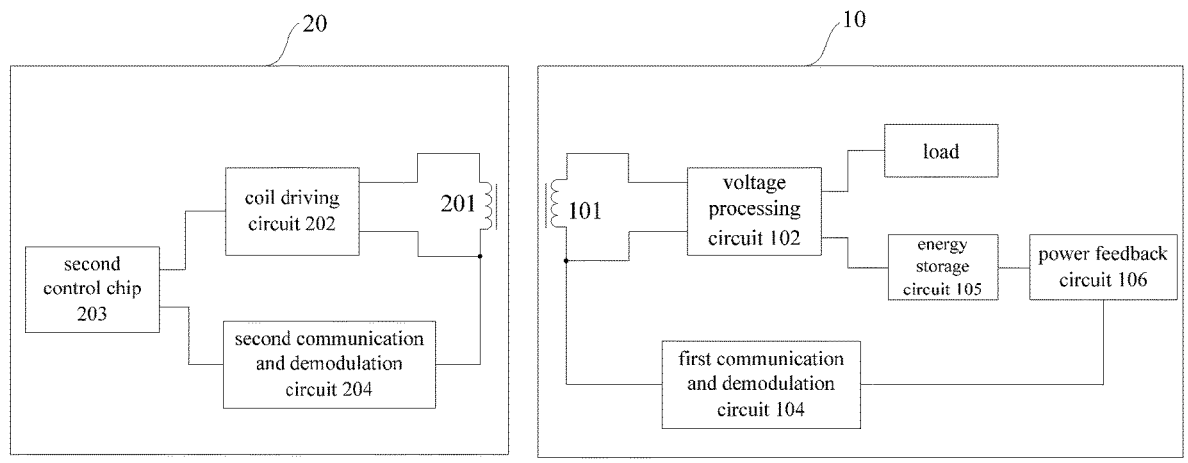
FIG. 6 is a block diagram of a wireless power supply system for a cooking appliance according to another embodiment of the present disclosure.

According to another embodiment of the present disclosure, as shown in FIG. 6, the wireless power supply system includes a reception device 10 and a transmission device 20.

The reception device 10 includes a reception coil 101, a voltage processing circuit 102, an energy storage circuit 105, a power feedback circuit 106, and a first communication and demodulation circuit 104, where the voltage processing circuit 102 is connected with the reception coil 101, the voltage processing circuit 102 is connected with the energy storage circuit 105, the energy storage circuit 105 is connected with the power feedback circuit 106, and the power feedback circuit 106 is connected with the reception coil 101 via the first communication and demodulation circuit 104, and the power feedback circuit 106 is configured to detect the output power of the reception device 10. The transmission device 20 includes a transmission coil 201 matched with the reception coil 101, a coil driving circuit 202 connected with the transmission coil 201, a second control chip 203 connected with the coil driving circuit 202 and the second communication and demodulation circuit 204 respectively, and a second communication and demodulation circuit 204 connected with the transmission coil 201.

The second control chip 203 controls the coil driving circuit 202 to drive the transmission coil 201 to generate an alternating electromagnetic field, the reception coil 101 generates an induction voltage signal according to the alternating electromagnetic field, and the voltage processing circuit 102 processes the induction voltage signal to output a stabilized power supply so as to supply power to a load and charge the energy storage circuit 105. In addition, when the stabilized power supply is powered down due to sudden load increase, the energy storage circuit 105 supplies power to the power feedback circuit 106; the first communication and demodulation circuit 104 modulates the output power to load the power modulation signal to the reception coil 101; the second communication and demodulation circuit 204 receives the power modulation signal from the transmission coil 203, and demodulates the power modulation signal to send the output power to the second control chip 203; and the second control chip 203 adjusts the transmission power of the transmission device 201 according to the output power so as to enable the transmission power to be matched with the output power.

In an embodiment of the present disclosure, as shown in FIG. 2, the cooking appliance may include a pot cover 100 on which the reception device 10 may be provided and a pot body 200 on which the transmission device 20 may be provided. The cooking pot may be an electric pressure cooker or an electric rice cooker or the like. Also, the transmission coil 201 and the reception coil 101 are equivalent in size and provided coaxially so that the reception coil 101 can well receive the alternating electromagnetic field generated by the transmission coil 201. The distance between the transmission coil 201 and the reception coil 101 may be 0-50 mm, so that the reception coil 101 can generate an induction voltage within the electromagnetic field radiation range of the transmission coil 201. The frequency of the alternating electromagnetic field may range from 80 KHz to 300 KHz.

It should be noted that when the sizes of the transmission coil 201 and the reception coil 101 are substantially the same as well as the numbers of windings of the coils, the transmission coil 201 and the reception coil 101 are equivalent in size. The size includes a diameter size, a coil thickness size and a shape size, etc. of the transmission coil 201 and the reception coil 101.

Specifically, mechanical positioning can be used to ensure that the reception coil 101 on the pot cover 100 and the transmission coil 201 on the pot body 200 are coaxial when the user closes the pot cover 100, as shown in FIG. 3.

After the user powers on the pot body 200 of the cooking appliance, the coil driving circuit 202 in the pot body 200 starts to work and drives the transmission coil 201 provided at the pot body 200 to generate an alternating electromagnetic field. When the reception coil 101 provided at the pot cover 100 induces the alternating electromagnetic field, an induction voltage signal is generated according to the alternating electromagnetic field, and then a voltage processing circuit 102 in the pot cover 100 processes the induction voltage signal to output a stabilized power supply so as to supply power to a load and a power feedback circuit 106 provided in the pot cover 100 and charge an energy storage circuit 105. Among them, the load may include a pressure detection sensor, a temperature detection sensor, a humidity detection sensor, a display, a signal processing module, etc. The load provided in the pot cover 100 starts to work after being powered on. For example, the temperature detection sensor starts to detect the temperature value in the cooking pot in real time, and may transmit the detected temperature value to the display in the pot cover 100 to be displayed via the display, so that the user can know the temperature information of the current cooking pot in real time. Meanwhile, the power feedback circuit 106 works after being powered on and detects the output power of the reception device 10, the first communication and demodulation circuit 104 modulates the output power to generate a power modulation signal, the power modulation signal is loaded onto the reception coil 101, mutual inductance is generated on the transmission coil 201, and the second communication and demodulation circuit 204 receives the power modulation signal via the transmission coil 201 and demodulates the power modulation signal; the second control chip 203 can obtain the output power of the reception device 10 according to the demodulated power modulation signal and adjust the transmission power of the transmission device 20 according to the output power, so that the transmission power is matched with the output power.

When the stabilized power supply is powered down due to sudden load increase, the power feedback circuit 106 can still maintain power supply for a period of time due to the existence of the energy storage circuit 105, so that the reception device 10 can continue to feed the output power back to the transmission device 20, such that power adjustment can continue, and the working reliability of the wireless power supply system is improved.

In embodiments of the present disclosure, an energy storage circuit 105 may include an energy storage capacitor or an energy storage battery. When the energy storage circuit 105 includes an energy storage capacitor, the capacity of the energy storage capacitor is determined according to the power consumption of the power feedback circuit 106. It should be noted that the amount of power stored in the energy storage capacitor or battery can maintain the power supply to the power feedback circuit 106 for more than 50 ms when the stabilized power supply is powered down.

Figure 7:
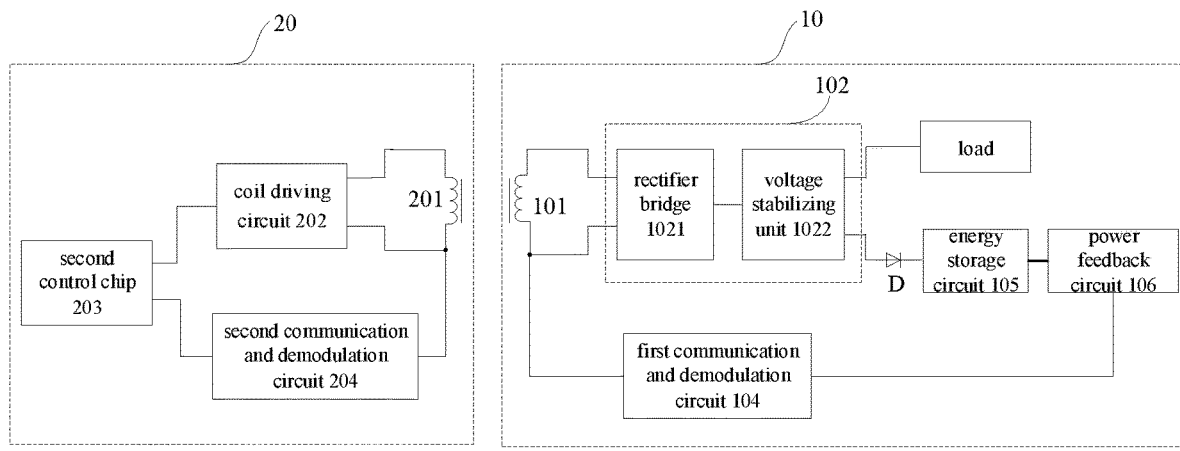
FIG. 7 is a block diagram of a wireless power supply system for a cooking appliance according to yet another embodiment of the present disclosure.

According to an embodiment of the present disclosure, as shown in FIG. 7, the voltage processing circuit 102 includes a rectifier bridge 1021 and a voltage stabilizing unit 1022. A first input terminal of the rectifier bridge 1021 is connected with one end of the reception coil 102, a second input terminal of the rectifier bridge 1021 is connected with the other end of the reception coil 101, an output terminal of the rectifier bridge 1021 is connected with the voltage stabilizing unit 1022, and the voltage stabilizing unit 1022 outputs a stabilized voltage supply to the load and the energy storage circuit 103.

Specifically, the voltage stabilizing unit 1022 may include a 7805 three-terminal integrated voltage stabilizer, an input terminal of the voltage stabilizing unit 1022 is connected with an output terminal of the rectifier bridge 1021, an output terminal of the voltage stabilizing unit 1022 is connected with the energy storage circuit 103, and the voltage stabilizing unit 1022 may output a stable direct current (stabilized voltage supply) to the load and the energy storage circuit 103 so as to supply power to the energy storage circuit 103 and the load.

Further, according to an embodiment of the present disclosure, as shown in FIG. 7, a diode D is further connected between the voltage stabilizing unit 1022 and the energy storage circuit 103, an anode of the diode D is connected with an output terminal of the voltage stabilizing unit 1022, and a cathode of the diode D is connected with the energy storage circuit 103. The diode D can prevent current backflow and further improve the working reliability of the wireless power supply system.

It is to be understood that the coil driving circuit 202 may include a driving unit, and a bridge circuit connected with the driving unit; and the driving unit may be a PWM (Pulse Width Modulation) driving circuit, and the bridge circuit may be a half-bridge circuit or a full-bridge circuit, not specifically limited. The second communication and demodulation circuit 204 and the first communication and demodulation circuit 104 may be conventional modulation and demodulation circuits, which are not specifically limited.

In summary, according to the wireless power supply system for the cooking appliance of the embodiment of the present disclosure, the second control chip drives the transmission coil to generate an alternating electromagnetic field by controlling the coil driving circuit, the reception coil generates an induction voltage signal according to the alternating electromagnetic field, and the voltage processing circuit processes the induction voltage signal to output a stabilized power supply so as to supply power to the load and charge the energy storage circuit; and when the stabilized power supply is powered down due to sudden load increase, the energy storage circuit supplies power to the power feedback circuit; the first communication and demodulation circuit modulates the output power to load the power modulation signal to the reception coil; the second communication and demodulation circuit receives the power modulation signal from the transmission coil, and demodulates the power modulation signal to send the output power to the second control chip; and the second control chip adjusts the transmission power of the transmission device according to the output power so as to enable the transmission power to be matched with the output power. Therefore, when the stabilized power supply is powered down due to sudden load increase, the system can supply power to the power feedback circuit by the energy storage circuit, so as to continue the power adjustment and improve the working reliability.

In order to implement the embodiment, the present disclosure also provides a cooking appliance.

A cooking appliance according to an embodiment of the present disclosure includes a wireless power supply system for a cooking appliance according to any of the above embodiments of the present disclosure. Specifically, the cooking appliance may be one of an electric pressure cooker and an electric rice cooker.

According to the cooking appliance provided by the embodiment of the present disclosure, with the above wireless power supply system, the energy storage circuit can supply power to the power feedback circuit when the stabilized power supply is powered down due to sudden load increase, so as to continue the power adjustment and improve the working reliability.

In the description of the present disclosure, it is to be understood that the orientation or position relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", and the like, are based on the orientation or position relationships shown in the drawings, merely to facilitate describing the present disclosure and to simplify the description, and are not intended to indicate or imply that the referenced device or element must have a particular orientation, be constructed and operated in a particular orientation. It is therefore not to be understood as limiting the present disclosure.

Furthermore, the terms "first" and "second" are used for descriptive purposes only and are not to be construed as indicating or implying relative importance or implicitly indicating the number of technical features indicated. Thus, the features defining "first" and "second" may explicitly or implicitly include at least one such feature. In the description of the present disclosure, "a plurality of" means at least two, e.g., two, three, etc., unless specifically defined otherwise.

In the present disclosure, unless expressly stated and defined otherwise, the terms "mounted", "joined", "connected", "fixed", and the like should be construed broadly, e.g., either fixedly connected or removably connected, or integrated; mechanically connected or electrically connected; joined directly or indirectly through an intermediary, either internal to the two elements, or by interaction of the two elements, unless expressly defined otherwise. The specific meaning of the above terms in the present disclosure will be understood by those skilled in the art in accordance with specific conditions.

In the present disclosure, unless expressly stated and defined otherwise, a first feature "up" or "down" a second feature may be that the first and second features are in direct contact, or that the first and second features are in indirect contact via an intermediary. Furthermore, the first feature may be "on", "over" and "above" the second feature, but the first feature may be directly over or obliquely over the second feature, or merely indicate that the level of the first feature is higher than that of the second feature. The first feature "under", "below" and "beneath" the second feature may be that the first feature is directly below or obliquely below the second feature, or simply indicates that the level of the first feature is lower than that of the second feature.

In the description of this specification, reference to the description of the terms "an embodiment", "some embodiments", "examples", "specific examples", or "some examples", etc., means that a particular feature, structure, material, or characteristic described in connection with the embodiment or example is included in at least one embodiment or example of the present disclosure. In the present specification, schematic representations of the above terms are not necessarily directed to the same embodiments or examples. Furthermore, the particular features, structures, materials, or characteristics described may be combined in any one or more embodiments or examples in a suitable manner. Moreover, various embodiments or examples described in this specification, as well as features of various embodiments or examples, may be incorporated or combined by those skilled in the art in a case without contradicting each other.

While embodiments of the present disclosure have been shown and described above, it is to be understood that the above-described embodiments are illustrative and not restrictive of the present disclosure, and that changes, modifications, substitutions and alterations will occur to those skilled in the art without departing from the scope of the present disclosure.

What is claimed is:

1. A wireless power supply system for a cooking appliance comprising:
   a power transmission device including:
      a transmission coil;
      a first control chip; and
      a coil driving circuit coupled to the transmission coil and configured to be controlled by the first control chip to:
         drive the transmission coil to generate an alternating electromagnetic field; and
         vary a resonance voltage of the transmission coil; and
   a power reception device including:
      a second control chip;
      a reception coil matching the transmission coil and configured to sense the alternating electromagnetic field to generate a varying induction voltage signal that varies according to the varying resonance voltage;
      a communication and demodulation circuit configured to demodulate the varying induction voltage signal to output demodulated data; and
   a voltage processing circuit coupled to the reception coil and configured to process the induction voltage signal to output a power supply for powering the second control chip and the communication and demodulation circuit
      wherein the communication and demodulation circuit is further configured to output the demodulated data to the second control chip.

2. The wireless power supply system according to claim 1, wherein the voltage processing circuit is further configured to output the power supply to a load provided in a pot cover of the cooking appliance.

3. The wireless power supply system according to claim 1, wherein:
   the coil driving circuit includes:
      a driving unit coupled to the first control chip; and
      a bridge circuit coupled to the driving unit; and
   the first control chip is further configured to adjust an output power of the bridge circuit by adjusting a duty ratio or a frequency of a control signal output to the driving unit, so as to control the coil driving circuit to vary the resonance voltage of the transmission coil.

4. The wireless power supply system according to claim 3, wherein:
   the bridge circuit includes a half-bridge circuit including:
      a first switch transistor, a control terminal of the first switch transistor being connected with a first driving output terminal of the driving unit, and a first terminal of the first switch transistor being connected with a preset power supply; and
      a second switch transistor, a control terminal of the second switch transistor being connected with a second driving output terminal of the driving unit, a first terminal of the second switch transistor being connected with a second terminal of the first switch transistor, and a second terminal of the second switch transistor being grounded; and
   one end of the transmission coil is connected to a node between the first switch transistor and the second switch transistor via a first capacitor, and another end of the transmission coil is grounded.

5. The wireless power supply system according to claim 1, wherein the voltage processing circuit includes:
   a rectifier bridge, a first input terminal of the rectifier bridge being connected with one end of the reception coil via a capacitor, and a second input terminal of the rectifier bridge being connected with another end of the reception coil; and
   a voltage stabilizer connected with a positive output terminal of the rectifier bridge and configured to output the voltage supply.

6. The wireless power supply system according to claim 5, wherein:
   an input terminal of the communication and demodulation circuit is connected with the other end of the reception coil;
   an output terminal of the communication and demodulation circuit is connected with the second control chip; and
   a power supply terminal of the communication and demodulation circuit is connected with an output terminal of the voltage stabilizer.

7. The wireless power supply system according to claim 1, wherein:
   the power reception device further includes:
      a power feedback circuit coupled to the reception coil via the first communication and demodulation circuit, and configured to detect an output power of the power reception device; and an energy storage circuit coupled to the voltage processing circuit and the power feedback circuit, the energy storage circuit being configured to:
be charged by the power supply outputted by the voltage processing circuit; and
supply power to the power feedback circuit in response to a decrease of power supply outputted by the voltage processing circuit;

the communication and demodulation circuit is a first communication and demodulation circuit that is further configured to modulate the output power of the power reception device to apply a power modulation signal to the reception coil;

the power transmission device further includes a second communication and demodulation circuit coupled to the first control chip and the transmission coil, the second communication and demodulation circuit being configured to:
receive the power modulation signal from the transmission coil; and
demodulate the power modulation signal; and
the first control chip is further configured to adjust a transmission power of the power transmission device according to the demodulated power modulation signal.

8. The wireless power supply system according to claim 7, wherein the energy storage circuit includes an energy storage capacitor or an energy storage battery.

9. The wireless power supply system according to claim 8, wherein the energy storage circuit includes the energy storage capacitor, and a capacity of the energy storage capacitor is determined according to a power consumption of the power feedback circuit.

10. The wireless power supply system according to claim 7, wherein the power reception device further includes a diode, an anode of the diode being connected with an output terminal of the voltage processing circuit, and a cathode of the diode being connected with the energy storage circuit.

11. The wireless power supply system according to claim 1, wherein the transmission coil and the reception coil are equivalent in size and are arranged coaxially.

12. The wireless power supply system according to claim 11, wherein a distance between the transmission coil and the reception coil is in a range of 0 to 50 cm.

13. The wireless power supply system according to claim 1, wherein:
the cooking appliance includes a pot cover and a pot body;
the power reception device is provided at the pot cover; and
the power transmission device is provided at the pot body.

14. A cooking appliance comprising:
a pot cover;
a pot body; and
a wireless power supply system including:
a power transmission device provided at pot body and including:
a transmission coil;
a first control chip; and
a coil driving circuit coupled to the transmission coil and configured to be controlled by the first control chip to:
drive the transmission coil to generate an alternating electromagnetic field; and
vary a resonance voltage of the transmission coil; and
a power reception device provided at the pot cover and including:
a second control chip;
a reception coil matching the transmission coil and configured to sense the alternating electromagnetic field to generate a varying induction voltage signal that varies according to the varying resonance voltage;
a communication and demodulation circuit configured to demodulate the varying induction voltage signal to output demodulated data; and
a voltage processing circuit coupled to the reception coil and configured to process the induction voltage signal to output a power supply for powering the second control chip and the communication and demodulation circuit
wherein the communication and demodulation circuit is further configured to output the demodulated data to the second control chip.

15. The cooking appliance according to claim 14, wherein the cooking appliance is an electric pressure cooker or an electric rice cooker.

* * * * *